(12) United States Patent
De Wilde et al.

(10) Patent No.: US 7,394,401 B2
(45) Date of Patent: Jul. 1, 2008

(54) DEVICE AND METHOD FOR PREVENTING SPEEDING

(75) Inventors: Jim Sven Anthony De Wilde, Lisse (NL); Tom Marnix Alexander De Wilde, Lisse (NL)

(73) Assignee: Stichting Noble House, Lisse (NL)

( * ) Notice: Subject to any disclaimer, the term of this patent is extended or adjusted under 35 U.S.C. 154(b) by 221 days.

(21) Appl. No.: 10/509,169

(22) PCT Filed: Mar. 25, 2003

(86) PCT No.: PCT/NL03/00225

§ 371 (c)(1),
(2), (4) Date: Oct. 31, 2005

(87) PCT Pub. No.: WO03/081274

PCT Pub. Date: Oct. 2, 2003

(65) Prior Publication Data

US 2006/0058938 A1    Mar. 16, 2006

(30) Foreign Application Priority Data

Mar. 27, 2002    (NL) .................................... 1020265

(51) Int. Cl.
*G08G 1/01* (2006.01)
(52) U.S. Cl. ...................... 340/936; 340/905; 340/901; 701/93; 701/117; 701/119

(58) Field of Classification Search ................. 340/905, 340/901, 936; 701/93, 117, 119
See application file for complete search history.

(56) References Cited

U.S. PATENT DOCUMENTS

| 5,485,161 | A | 1/1996 | Vaughn |
| 5,977,884 | A | 11/1999 | Ross |
| 6,201,493 | B1 | 3/2001 | Silverman |
| 6,265,989 | B1 | 7/2001 | Taylor |
| 6,728,605 | B2 * | 4/2004 | Lash et al. ..................... 701/1 |
| 6,845,317 | B2 * | 1/2005 | Craine ......................... 701/200 |
| 6,895,324 | B2 * | 5/2005 | Straub ......................... 701/93 |
| 7,042,347 | B2 * | 5/2006 | Cherouny ................... 340/439 |

FOREIGN PATENT DOCUMENTS

| DE | 297 11 248 U 1 | 12/1998 |
| GB | 2 119 092 | 11/1983 |
| GB | 2 371 432 | 7/2002 |
| JP | 10-239333 | 9/1998 |
| KR | 2001001409 | 1/2001 |
| WO | WO 97/21110 | 6/1997 |

* cited by examiner

Primary Examiner—Daryl C Pope
(74) Attorney, Agent, or Firm—The Webb Law Firm

(57) ABSTRACT

A device for preventing a vehicle from speeding, which device comprises a switching device, a speedometer present in the vehicle, which is connected to said switching device and which measures the speed of the vehicle, as well as a transmitter connected thereto, wherein the switching device is so arranged that the transmitter will only transmit a signal mainly if and as long as the speed measured by the speedometer is higher than a predetermined limiting value.

10 Claims, 1 Drawing Sheet

DEVICE AND METHOD FOR PREVENTING SPEEDING

BACKGROUND OF THE INVENTION

The invention relates to a device for preventing a vehicle from speeding.

Speeding checks are currently being carried out to an increasing extent, at least in the Netherlands, and as a consequence an increasing number of increasingly heavy fines are being imposed. Consequently there is a need among car owners and drivers for a device by means of which the risk of receiving such fines can be reduced in an efficient and simple manner.

SUMMARY OF THE INVENTION

To that end, the device comprises a switching device, a speedometer present in the vehicle, which is connected to said switching device and which measures the speed of the vehicle, as well as a transmitter connected thereto, in which the switching device is arranged in such a manner that the transmitter will only transmit a signal mainly if and as long as the speed measured by the speedometer is higher than a predetermined limiting value. It will be understood that said limiting value preferably corresponds to the local maximum speed. The signal may be a warning signal, for example, which can induce the driver to reduce the speed of the vehicle.

In a first embodiment, the device comprises inputting means, by means of which a user can adjust the limiting value at his own discretion. In a second preferred embodiment, the device comprises a GPS (Global Positioning System) position finding device, in which the limiting value is adjusted in dependence on the geographic position of the vehicle as found. This latter variant is in particular advantageous if the device is connected to a database in which the geographic positions are linked to the maximum speed that locally obtains, so that the adjusted limiting value will automatically correspond to the local maximum speed at practically any moment.

In another preferred embodiment, the speedometer also comprises a GPS position finding device, in which the speed is determined in that the distance between two positions as found is divided by the time required for covering said distance.

Preferably, the transmitted signal comprises an acoustic signal for warning the driver. Furthermore, the transmitted signal preferably comprises light and/or laser pulses. Light pulses, too, constitute an efficient way of warning the driver of a vehicle, whilst laser pulses may be used effectively for causing interference with any external speed measuring equipment operating on the basis of laser techniques, assuming, of course, that this is legally allowed.

In a special preferred embodiment of the invention, the device furthermore comprises a detector for detecting external measuring equipment for measuring the speed of a vehicle, in which the switching device is furthermore so arranged that the signal will only be transmitted upon detection of said external measuring equipment. This enables the driver to adjust the speed of the vehicle in time upon detection of such measuring equipment, whilst the driver will not be unnecessarily alerted to the presence of such equipment when driving at a speed below the allowed speed.

The use of the aforesaid laser pulses thus makes it possible to prevent unnecessary transmission of the interference signal when the vehicle is not driving faster than the maximally allowed speed.

The invention also relates to a method for preventing speeding by a vehicle, in which a switching device is connected to a speedometer present in the vehicle, which measures the speed of the vehicle, in which the switching device only allows a transmitter connected thereto to transmit a signal mainly if and as long as the speed measured by the speedometer exceeds a predetermined limiting value.

BRIEF DESCRIPTION OF THE DRAWINGS

The invention will now be explained in more detail by means of an embodiment which is schematically shown in FIG. 1.

DETAILED DESCRIPTION OF THE PREFERRED EMBODIMENTS

Figure 1:
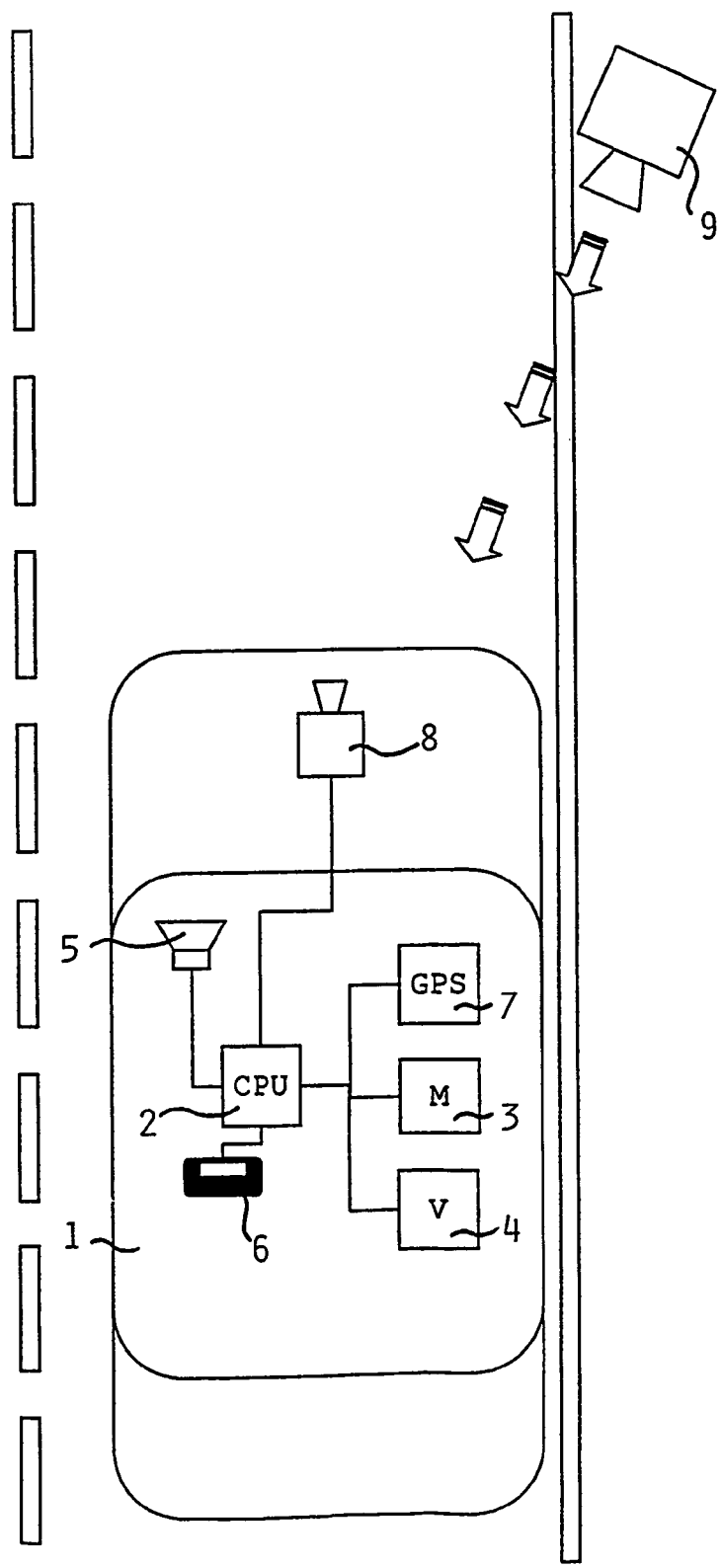

The Figure schematically shows a car 1 in top plan view while said car is driving on a road. The car 1 is fitted with a central processing unit 2, which is connected to a memory module 3, a speedometer 4 and a loudspeaker 5. Furthermore, the central processing unit is connected to an input/output unit 6, which is fitted with a small keypad and a small display screen. In a simple embodiment, the driver inputs a limiting value as regards the speed, which may be a local maximum speed, before or during a trip by means of said input/output unit 6, upon exceeding of which speed the driver wishes to hear an acoustic warning signal that will enable him to reduce his speed. The limiting value is stored in the memory module 3. The central processing unit 2 receives information as to the actual speed of the car from the speedometer 4, and the central processing unit 2 activates the loudspeaker 5, which transmits a warning signal if and as long as the actual speed is higher than the adjusted limiting value.

In a more extensive embodiment, the central processing unit 2 is also connected to a GPS receiver 7, which is capable of establishing the geographic position of the car. GPS receivers are known per se, and their operation is considered to be known, therefore. In this embodiment, the memory module 3 comprises a database in which geographic positions, in particular of the road system and the locally obtaining maximum speeds, are stored. Preferably, said database is updated with new information and alterations on a regular basis. The central processing unit 2 determines the local maximum speed on the basis of the geographic position supplied by the GPS receiver and the information obtained from the database and inputs said value as a limiting value. When this is done at short intervals, the limiting value will correspond to the local maximum speed practically at all times.

In yet another embodiment, the central processing unit 2 is furthermore connected to a laser detector/transmitter 8, which is capable of detecting the laser signal from an external laser speed measuring device 9. If such a device is detected, and if moreover the speed of the car 1 is higher than the adjusted limiting value, the central processing unit 2 will activate the loudspeaker to transmit a special warning signal. The warning signal may also be a (flashing) light signal. In those cases where this is legally allowed, the driver may also opt to have the central processing unit 2 cause the laser detector/transmitter 8 to transmit interference light or laser pulses instead of or simultaneously with the warning signal, as a result of which the measuring device 9 will be unable to carry out a speed measurement. An example of such a method for causing interference by means of laser pulses is described in International patent application WO 97/21110, and consequently it will not be discussed anew herein.

The invention claimed is:

1. A device for preventing a vehicle from speeding, which device comprises a switching device, a speedometer present in the vehicle, which is connected to said switching device and which measures the speed of the vehicle, as well as a transmitter connected thereto, wherein the switching device is so arranged that the transmitter will transmit a signal only if and as long as the speed measured by the speedometer is higher than a predetermined limiting value, wherein the speedometer also comprises a GPS position finding device, and wherein the speed is determined in that the distance between two positions as found is divided by the time required for covering said distance.

2. The device according to claim 1, wherein the device comprises inputting means, by means of which a user can adjust the limiting value at his own discretion.

3. The device according to claim 1, wherein the limiting value is adjusted in dependence on the geographic position of the vehicle as found.

4. The device according to claim 1, wherein the transmitted signal comprises an acoustic signal.

5. The device according to claim 1, wherein the transmitted signal comprises one of light and laser pulses.

6. A device for preventing a vehicle from speeding, which device comprises a switching device, a speedometer present in the vehicle, which is connected to said switching device and which measures the speed of the vehicle, as well as a transmitter connected thereto, wherein the switching device is so arranged that the transmitter will transmit a signal only if and as long as the speed measured by the speedometer is higher than a predetermined limiting value, wherein the device furthermore comprises a detector for detecting external measuring equipment for measuring the speed of a vehicle, wherein the switching device is furthermore so arranged that the signal will only be transmitted upon detection of said external measuring equipment.

7. The device according to claim 6, wherein the device comprises inputting means, by means of which a user can adjust the limiting value at his own discretion.

8. The device according to claim 6, wherein the limiting value is adjusted in dependence on the geographic position of the vehicle as found.

9. The device according to claim 6, wherein the transmitted signal comprises an acoustic signal.

10. The device according to claim 6, wherein the transmitted signal comprises one of light and laser pulses.

* * * * *